(12) United States Patent
Sugiyama et al.

(10) Patent No.: US 8,073,415 B2
(45) Date of Patent: Dec. 6, 2011

(54) TUNABLE RECEIVING APPARATUS AND METHOD THEREFOR

(75) Inventors: Takahiro Sugiyama, Hitachi (JP); Ken Takei, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 1112 days.

(21) Appl. No.: 11/714,277

(22) Filed: Mar. 6, 2007

(65) Prior Publication Data

US 2007/0213024 A1 Sep. 13, 2007

(30) Foreign Application Priority Data

Mar. 7, 2006 (JP) ................................. 2006-061455

(51) Int. Cl.
H04B 1/26 (2006.01)
(52) U.S. Cl. ...................................... 455/193.1; 455/254
(58) Field of Classification Search ............... 455/188.1, 455/191.1, 191.2, 191.3, 193.1, 193.3, 289, 455/290, 315, 318, 91, 115.1, 118, 119, 120, 455/121, 127.1, 129; 725/731, 734
See application file for complete search history.

(56) References Cited

U.S. PATENT DOCUMENTS

| | | | | |
|---|---|---|---|---|
| 5,483,688 A | * | 1/1996 | English et al. | 455/193.1 |
| 5,678,211 A | * | 10/1997 | Badger | 455/191.1 |
| 6,052,571 A | * | 4/2000 | Mishima et al. | 455/318 |
| 6,064,868 A | * | 5/2000 | Kobayashi | 455/193.1 |
| 2007/0207753 A1 | * | 9/2007 | Byun | 455/193.1 |
| 2008/0096604 A1 | | 4/2008 | Yamazaki et al. | |

FOREIGN PATENT DOCUMENTS

| | | |
|---|---|---|
| JP | A-4-505237 | 10/1992 |
| JP | 11-112374 | 4/1999 |
| JP | 2000-151448 | 5/2000 |
| JP | 2001-251131 | 9/2001 |
| JP | 2001-267950 | 9/2001 |
| JP | 2003-298341 | 10/2003 |
| JP | 2005-063123 | 3/2005 |
| JP | 2005-073113 | 3/2005 |
| WO | WO 90/11653 A1 | 10/1990 |
| WO | WO 2006/011323 A1 | 2/2006 |

OTHER PUBLICATIONS

Chinese Office Action dated Aug. 7, 2009, with English translation.
Japanese Office Action dated Oct. 19, 2010 (with English -language translation).

* cited by examiner

*Primary Examiner* — Thanh C Le
(74) *Attorney, Agent, or Firm* — McGinn IP Law Group, PLLC

(57) ABSTRACT

A tunable receiving apparatus, includes a variable capacitative member, a tunable antenna having a resonant frequency controlled by the variable capacitative member, a tuner outputting a control signal related to a receiving-sensitivity of the tunable antenna, and a control circuit processing the control signal and controlling the variable capacitative member. The variable capacitative member is controlled automatically by the control circuit to optimize the receiving-sensitivity.

17 Claims, 8 Drawing Sheets

TUNABLE RECEIVING APPARATUS AND METHOD THEREFOR

The present application is based on Japanese Patent Application No. 2006-061455 filed on Mar. 7, 2006, the entire contents of which are incorporated herein by reference.

BACKGROUND OF THE INVENTION

1. Field of the Invention

This invention relates to an antenna module incorporated in a mobile wireless terminal or a wireless apparatus such as a mobile phone, personal data assistant (PDA), notebook computer, or a game machine, and to a receiving apparatus mounting the antenna module. Especially, this invention relates to the antenna module allowed to change a frequency characteristic of the antenna depending on a receiving frequency channel, and the receiving apparatus mounting the antenna module.

2. Description of the Related Art

A monopole antenna is proposed in Japanese Patent Publication JP-A-2001-251131, as a conventional antenna to be applied to a wireless system receiving a radio wave in a terrestrial analog broadcasting system or a terrestrial digital broadcasting system, in which a lower frequency than that of a mobile phone is used.

Such an antenna has a broadband characteristic and can be applied to the entire frequency band which is used in the system. However, for instance, since a wavelength received by the antenna is 64 cm in a terrestrial digital broadcasting system of Japan, there is a problem that the monopole antenna is difficult to be incorporated in a mobile terminal, such as a mobile phone, PDA, etc. receiving apparatus which have a maximum size of about 20 cm.

Presently, it is thought that the mobile phone will be combined with a receiving function for television broadcast or radio broadcast, in addition to a calling function. These broadcasting systems (i.e., television and radio) are assigned a different frequency band respectively and use a channel dividing the band by a frequency. For example, a terrestrial digital television broadcasting system of Japan is assigned a broad frequency band which is a UHF (Ultra High Frequency) band from 470 MHz to 770 MHz. Each broadcasting station is assigned a band, the bands being determined by dividing the broad frequency band by each 6 MHz (e.g., every 6 MHz). In such a system, a viewer needs to select a desired channel in order to watch a television broadcasting.

It is preferable that receiving the entire broad frequency band used by each wireless system is prevented, thereby to reduce an interfering wave (e.g., interference). Additionally, when an antenna size is sufficiently smaller than a wavelength of an electromagnetic wave adapted by the antenna (e.g., less than $1/10$), an antenna having a narrower receiving frequency band is expected to have better antenna sensitivity. For the first reason, to prevent a signal of another wireless system, which is an interfering wave for the television broadcast, from being received, an unnecessary frequency channel other than a desired frequency channel is sometimes eliminated by, for example, a tracking filter circuit which is disposed in a subsequent stage of the antenna.

Meanwhile, since the mobile wireless terminal is required to be downsized for improving portability, the antenna is also required to be downsized. In view of the above, a wireless terminal including a tunable antenna in which a center wavelength matching an impedance thereof with a calling frequency can be controlled, is disclosed in Japanese Patent Publication JP-A-2003-298341.

When the tunable antenna which has a sufficiently smaller size than a wavelength of a received electric wave is used and incorporated into the mobile phone, a Q-value of the antenna is much higher than an external antenna (i.e., such as a rod antenna). Thus, when the tunable antenna is incorporated in the mobile phone and so on, a resonant frequency of the antenna is changed a few MHz by manual approximation (e.g., by hand). Since the antenna having a very high Q-value has a narrow band and a reactive power accumulated around the antenna is large, a resonant frequency of the antenna may be changed slightly by manual approximation to the antenna, so that the receiving characteristic of the antenna about the desired frequency may be degraded.

Additionally, since the tunable antenna includes a variable capacitative member therein, a characteristic variation of each component, such as the variable capacitive member (e.g., variable capacitance diode), cannot be prevented in a mass production. Thus, when the receiving apparatus is mass-produced by a cheap component having a large characteristic variation, it is difficult to keep a uniform characteristic in any receiving apparatus, and a yield is degraded thereby.

Thus, prior to the present invention, there has been no conventional system or method which can provide an antenna module or a receiving apparatus which can receive an entire radio wave band used in a terrestrial analog broadcasting system or a terrestrial digital broadcasting system, and which includes a small size antenna which can be incorporated in a mobile wireless terminal such as a mobile phone or a PDA, by controlling automatically the resonant frequency of the antenna which has a high Q-value, a narrow band, and a high sensitivity. Additionally, there has been no antenna module or receiving apparatus which can prevent the degradation of the receiving characteristic by manually touching a package and the degradation of yield by the characteristic variation of the component.

SUMMARY OF THE INVENTION

In view of the foregoing and other exemplary problems, drawbacks, and disadvantages of the conventional methods and structures, an exemplary feature of the present invention is to provide a tunable receiving apparatus allowed to change a frequency characteristic of an antenna therein depending on a receiving frequency channel.

According to one exemplary aspect of the invention, a tunable receiving apparatus includes:

a variable capacitative member;

a tunable antenna controlled a resonant frequency thereof by the variable capacitative member;

a tuner outputting a control signal related to a receiving-sensitivity of the tunable antenna; and a control circuit processing the control signal and controlling the variable capacitative member, wherein the variable capacitative member is controlled automatically by the control circuit to optimize the receiving-sensitivity.

In the above exemplary invention, many exemplary modifications and changes can be made.

For example, the control signal outputted from the tuner depends on the receiving-sensitivity of a frequency band (e.g., receiving channel) which is required to receive and does not depend on the receiving-sensitivity of the frequency band which is not required to receive. For example, when channel 14 is received, there is a possibility that channel 13 and channel 15 adjacent to channel 14 are received by the tuner. However, according to the present invention, the receiving signal of only channel 14 is executed, and the control signal thereof is outputted. This is provided by using a signal whose frequency is selected in the tuner. Thereby, the receiving-sensitivity of the tunable antenna is optimized about only the desired channel.

Further, a resonant frequency of the tunable antenna can be controlled concurrently with the selection of the channel. The control signal outputted by the tuner may increase or decrease monotonically with regard to an increase of the receiving-sensitivity, so that a control algorithm can be simple. Still further, when the receiving-sensitivity is sufficiently large, the control signal may not be changed.

Additionally, the control circuit may include no less than one control voltage output in direct current, and the variable capacitative member may be controlled by the control voltage.

As described above, since the control circuit for outputting the control signal from the tuner and controlling the variable capacitative member are disposed, a receiving frequency band (e.g., the receiving channel) may be received by repetition of reading the control signal and changing the control voltage sequentially. It is not necessary to incorporate a table where a relation between the receiving channel and the control voltage of the variable capacitative member is regulated.

The control circuit may include a PWM (Pulse Width Modulation) circuit and a smoothing circuit having a resistive element and a capacitative element. Further, the control circuit may include an A/D-converter.

A micro controller may include a memory, monitor the control signal, start to change the control voltage sequentially when the receiving-sensitivity is deemed as less than a set value, store the control voltage to the memory temporarily where the receiving-sensitivity is recorded maximum, and set automatically the control voltage stored in the memory after termination of the sequential change of the control voltage.

Further, the micro controller may change the control voltage sequentially, the control voltage is continued to change in the same direction to the sequential change of the control when the receiving-sensitivity increases with regard to the sequential change of the control, the control voltage is reversed in the direction of the sequential change of the control when the receiving-sensitivity decreases against the sequential change of the control, the control voltage is optimized by repeating the change of the direction of the sequential change.

Additionally, the micro controller may monitor the control signal, increase an amount of the sequential changing of the control voltage when the receiving-sensitivity is deemed as less than a reference value, and decrease the amount of the sequential changing of the control voltage according to an increase of the receiving-sensitivity.

Still further, the micro controller may monitor the control signal, and increase an amount of the sequential changing of the control voltage when the amount where the receiving-sensitivity is deemed as less than a reference value is more than a set amount.

The above exemplary modifications may be made alone or in any combination thereof.

With the unique and unobvious structure of the present invention, by using a tunable antenna which is small size, has high-sensitivity, and the resonant frequency thereof is controllable, and using a receiving circuit which is synchronizable and tunable with the resonant frequency of the tunable antenna, a receiving apparatus can be provided, which can receive a lower radio wave of such a terrestrial analog broadcasting system or a terrestrial digital broadcasting system than that of the mobile phone. At this time, although the receiving-sensitivity of a conventional receiving apparatus may be degraded by manually closing the same, the receiving apparatus according to the present invention is controlled automatically to optimize the receiving-sensitivity, and the receiving-sensitivity thereof may not be degraded.

Further, according to the present invention, during mass production, the variation of a component constituting the receiving apparatus does not need to be considered. Thereby, since the yield increases, manufacturing costs can be decreased.

Additionally, since it is possible to tune the antenna in various situations by the micro controller, even when the receiving characteristic of the antenna is changed by opening and closing of the mobile phone, the notebook, or the game machine and so on, the receiving frequency can be tuned.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF THE EXEMPLARY EMBODIMENTS

Figure 1:
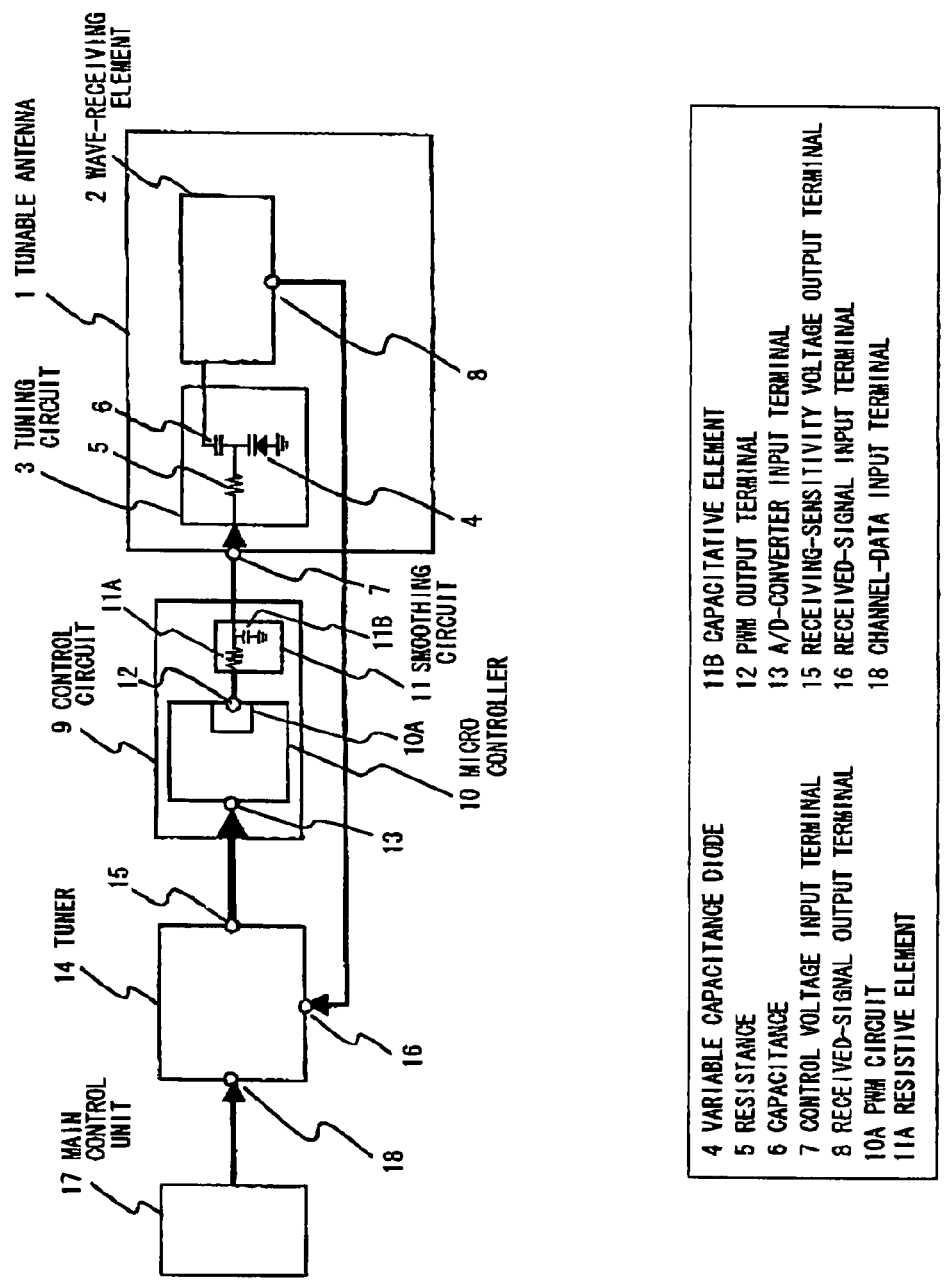
FIG. 1 is a diagram showing a receiving apparatus in a first exemplary embodiment according to the present invention.

Referring now to the drawings, and more particularly to FIGS. 1-8, there are shown exemplary embodiments of the methods and structures according to the present invention.

Exemplary Embodiment 1

A first exemplary embodiment according to the present invention is explained by using FIGS. 1-3, and FIG. 8.

Figure 2:
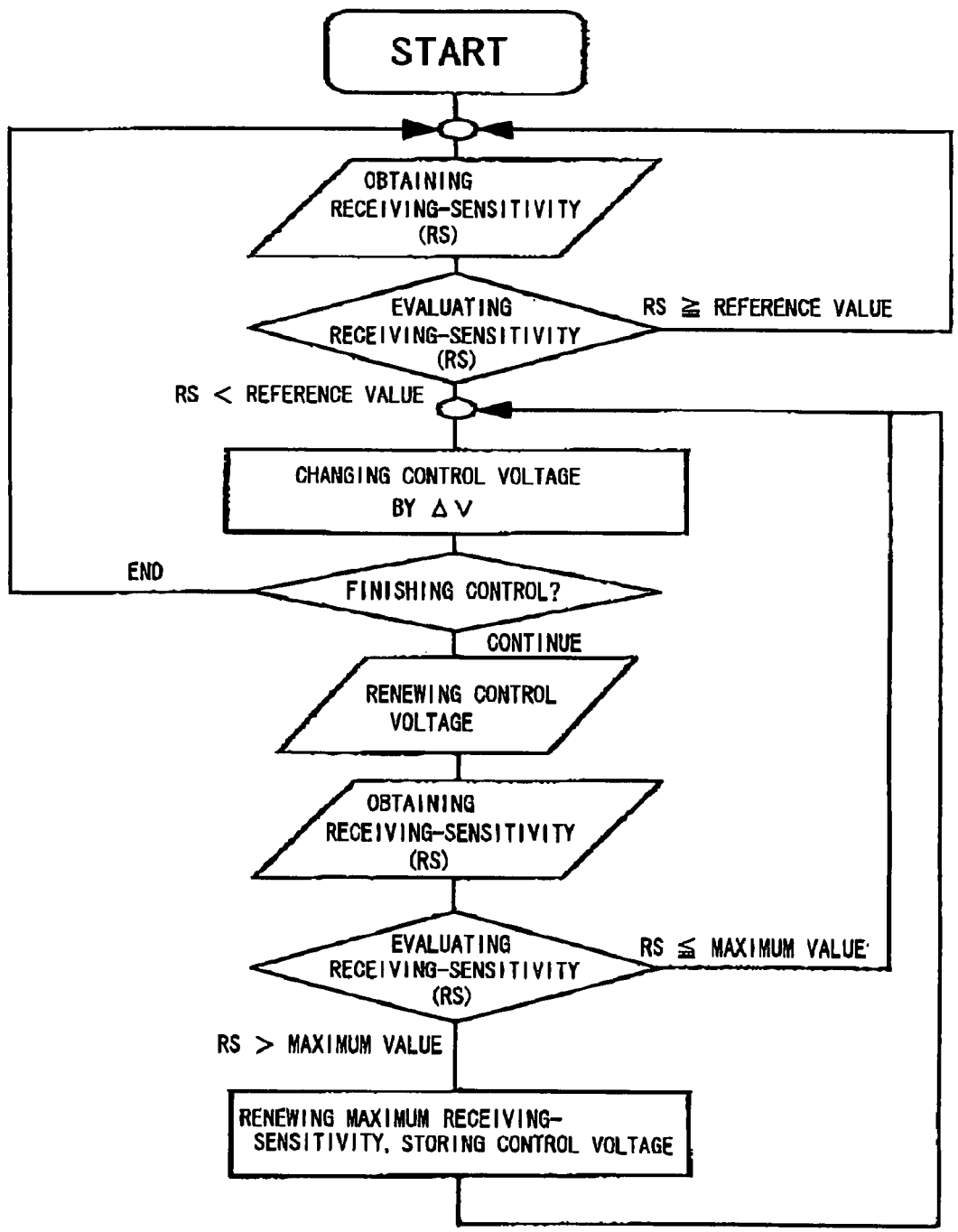
FIG. 2 is a flowchart showing a method of the first exemplary embodiment.

FIG. 1 is a diagram showing an antenna module and the receiving apparatus amounting the antenna module according to the first exemplary embodiment. FIG. 2 is a flowchart showing an automatic control algorithm according to the first exemplary embodiment.

In FIG. 1, a tunable antenna 1 includes a wave-receiving element 2 and a tuning circuit 3. The tuning circuit 3 includes a variable capacitance diode 4, a resistance 5, and a capacitance 6. A control voltage input terminal 7 and received-signal output terminal 8 are formed in the tunable antenna 1. A control circuit 9 includes a micro controller 10 and a smoothing circuit 11. The microcontroller 10 includes a PWM (Pulse Width Modulation) circuit 10A, an A/D-converter, and a memory (both not shown). The micro controller 10 includes a PWM output terminal 12 and an A/D-converter input terminal 13. The PWM output terminal 12 is connected to the smoothing circuit 11, and connected to the control voltage input terminal 7 of the tunable antenna 1 through the smoothing circuit 11. The smoothing circuit 11 may include a resistive element 11A and a capacitative element 11B. The A/D-converter input terminal 13 is connected to a receiving-sensitivity voltage output terminal 15 of a tuner 14. The tuner 14 includes a received-signal input terminal 16 which is connected to the received-signal output terminal 8. Moreover, the tuner 14 includes a channel-data input terminal 18 for receiving a channel-data from an outside of a receiving circuit (e.g., main control unit 17).

According to this exemplary embodiment, a channel-information received from the main control unit 17 located at the exterior to a receiving circuit is inputted to the tuner 14 through the channel-data input terminal 18. Based on the received channel-data, the tuner 14 demodulates a received signal of a desired channel, which is provided from the tunable antenna 1. At this time, according to the received signal input to the received-signal input terminal 16, a voltage related to a receiving-sensitivity is outputted from the receiving-sensitivity voltage output terminal 15.

In this exemplary embodiment, the voltage, which increases in proportion to a received voltage of a selected channel, is outputted. When the tuner 14 outputs the receiving-sensitivity voltage to the A/D-converter input terminal 13 of the micro controller 10 in the control circuit, the micro controller 10 converts the receiving-sensitivity voltage to a digital signal and starts a certain transaction therein.

In this exemplary embodiment, when the receiving-sensitivity voltage is deemed as less than a set value (e.g., a predetermined value), the micro controller 10 changes a PWM waveform outputted from the PWM output terminal 12 sequentially and changes a control voltage outputted through the smoothing circuit 11. Thereby, a direct-current voltage inputted to the tuning circuit through the control voltage input terminal 7 is changed, an opposite direction (reverse) voltage applied to the variable capacitance diode 4 is changed, a capacitance thereof is changed, and then a resonant frequency of the antenna can be changed ("A" in FIG. 3). The resonant frequency of the antenna is sequentially changed, the tuner 14 demodulates the received signal provided from tunable antenna 1 and renews the receiving-sensitivity voltage thereof in each case. When the receiving-sensitivity voltage is recorded maximum ("B" in FIG. 3), the micro controller 10 stores the control voltage in the memory therein.

Figure 3:
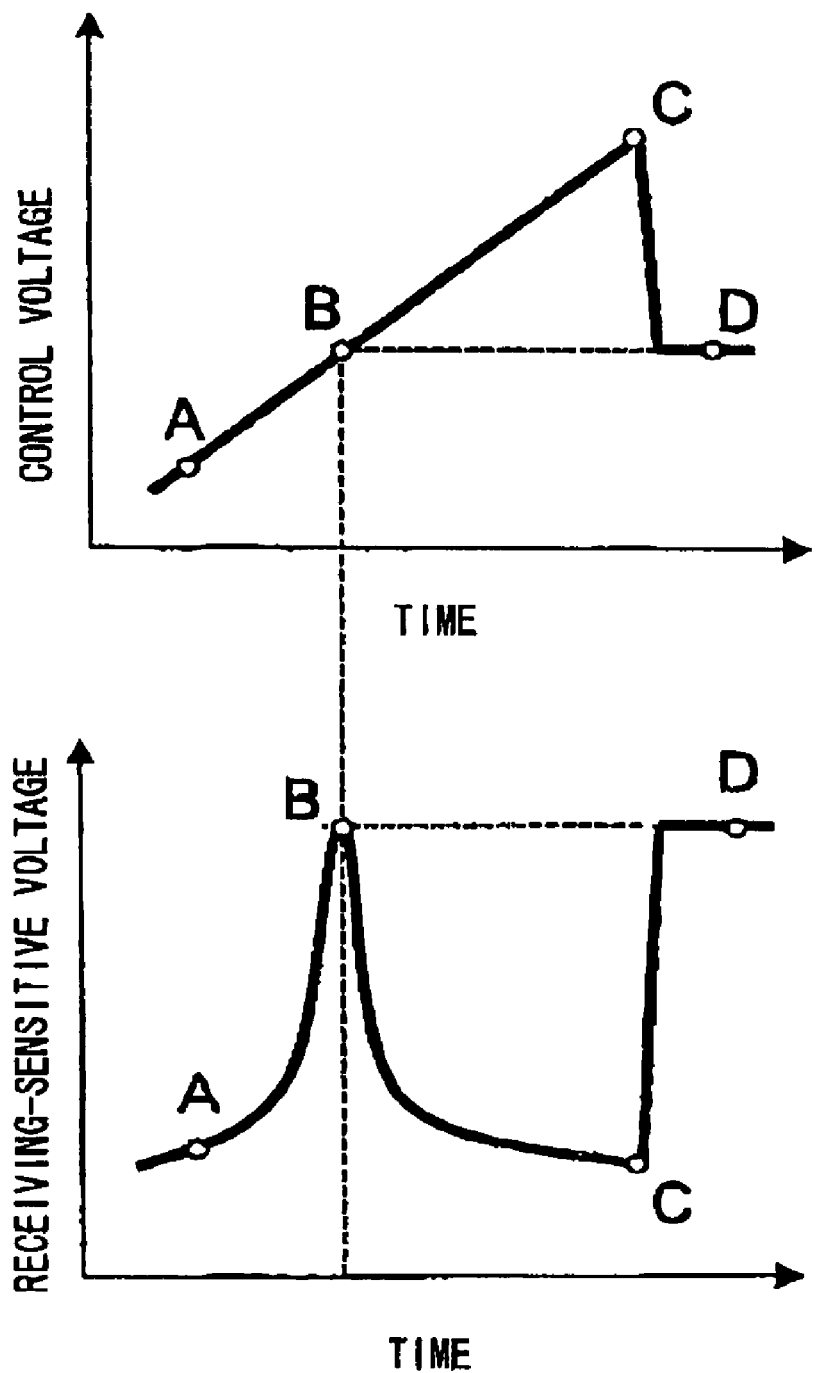
FIG. 3 is a graph of a control voltage and a receiving-sensitivity voltage with regard to a time showing a method in a first exemplary embodiment.

After the sequential changing of the resonant frequency is finished ("C" in FIG. 3), the micro controller 10 controls the PWM output so that the control circuit 9 can output the control voltage stored in the memory therein ("D" in FIG. 3). An exemplary embodiment of a graph of a control voltage and receiving-sensitivity voltage against a time change is shown in FIG. 3. By writing a program about the series of control to a flash memory in the micro controller 10 and executing the program, it is possible to receive the radio wave of a required receiving frequency.

When the tunable antenna 1 of the receiving apparatus is manually touched, the resonant frequency may normally change, and in many cases, may decrease. At this time, since a signal degraded in a sensitivity thereof is outputted from the received-signal output terminal 8 of the tunable antenna 1, a voltage lower than that before being manually touched, is outputted from the receiving-sensitivity voltage output terminal 15 of the tuner 14.

When the A/D-converter input terminal 13 detects the voltage, the same program is executed so that the control voltage receiving the radio wave with the maximum sensitivity can be determined. Thereby, the control voltage is renewed to an optimized voltage while being manually touched, and receiving is continued. Thus, the receiving apparatus according to the present invention can restrain a degradation of the receiving signal which is caused by being manually touched.

Moreover, even when the receiving channel is changed, since the receiving-sensitivity voltage is decreased, the same program is executed, then the control voltage is renewed so that the frequency of a desired channel can be received. That is, the receiving-sensitivity voltage is outputted depending on only the received signal of the channel selected and demodulated by the tuner 14. Moreover, even if each apparatus has a variation of the control voltage due to mass production, the program of the macro controller 10 can correct the control voltage, so that the variation does not affect the characteristic of the apparatus.

Figure 8:
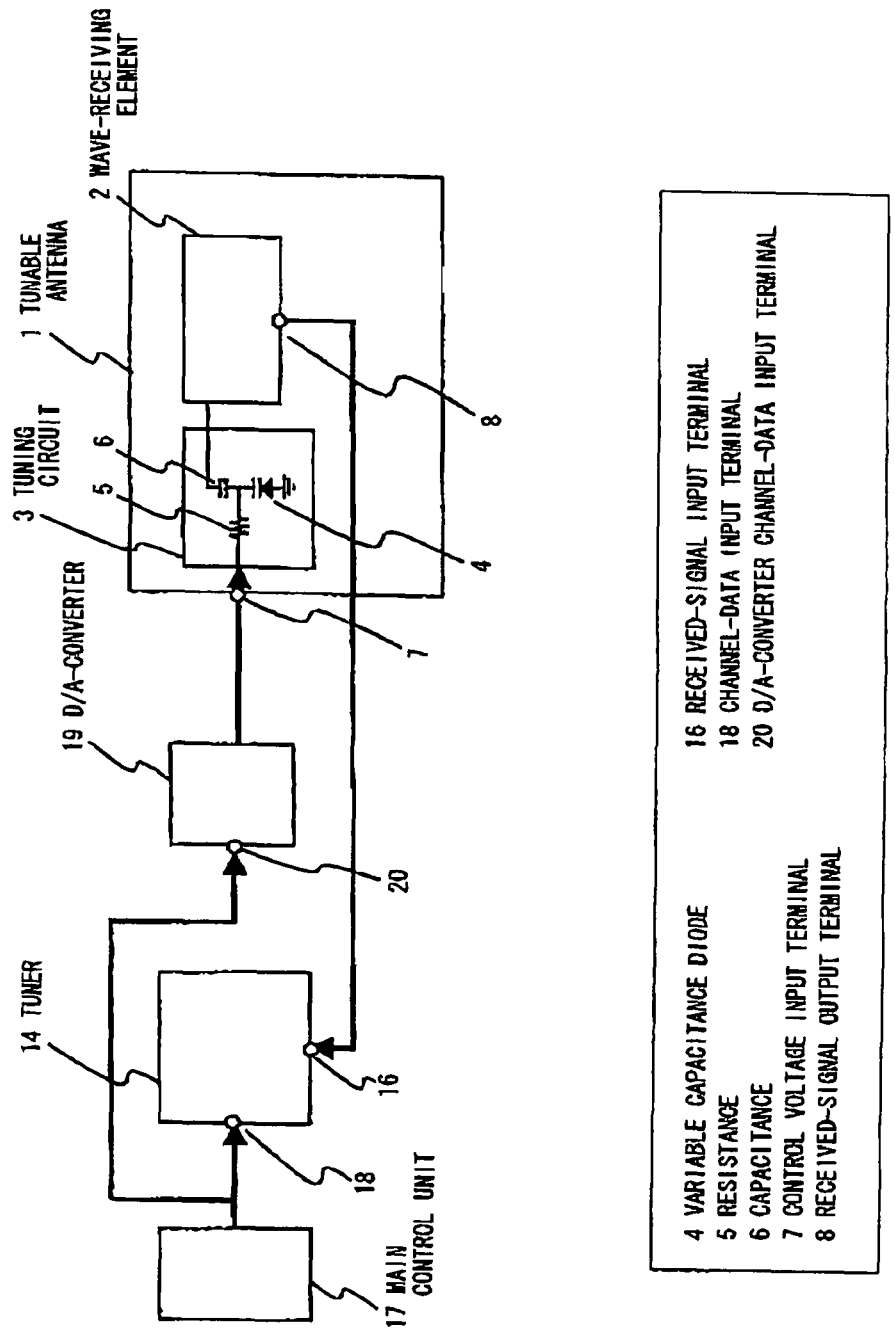
FIG. 8 is a diagram showing a receiving apparatus of a conventional tunable antenna.

A conventional receiving apparatus using a tunable antenna is shown in FIG. 8. A construction different from the first embodiment according to the present invention shown in FIG. 1 is to include a D/A-converter 19 instead of the control circuit 9. The D/A-converter 19 obtains a channel-information from a D/A-converter channel-data input terminal 20, which is provided from the main control unit 17. The channel-information is digital information corresponding to each channel and preliminarily written in the memory of the main control unit 17. The D/A-converter 19 converts the channel-information to an analog control signal, and provides the analog control signal to the control signal input terminal 7 of the tunable antenna 1. This conventional apparatus cannot correct the control voltage even if the characteristic change of the tunable antenna 1 causes the receiving-sensitivity voltage of the tuner 14 to degrade.

On the other hand, the receiving apparatus of the first exemplary embodiment according to the present invention shown in FIG. 1 can always achieve a good receiving characteristic by automatic control by the micro controller 10, even if there are some factors which cause the receiving-sensitivity voltage of the tunable antenna 1 to degrade, such as an influence of a hand in the proximity of the antenna, or a variation due to a mass production.

Exemplary Embodiment 2

Figure 4:
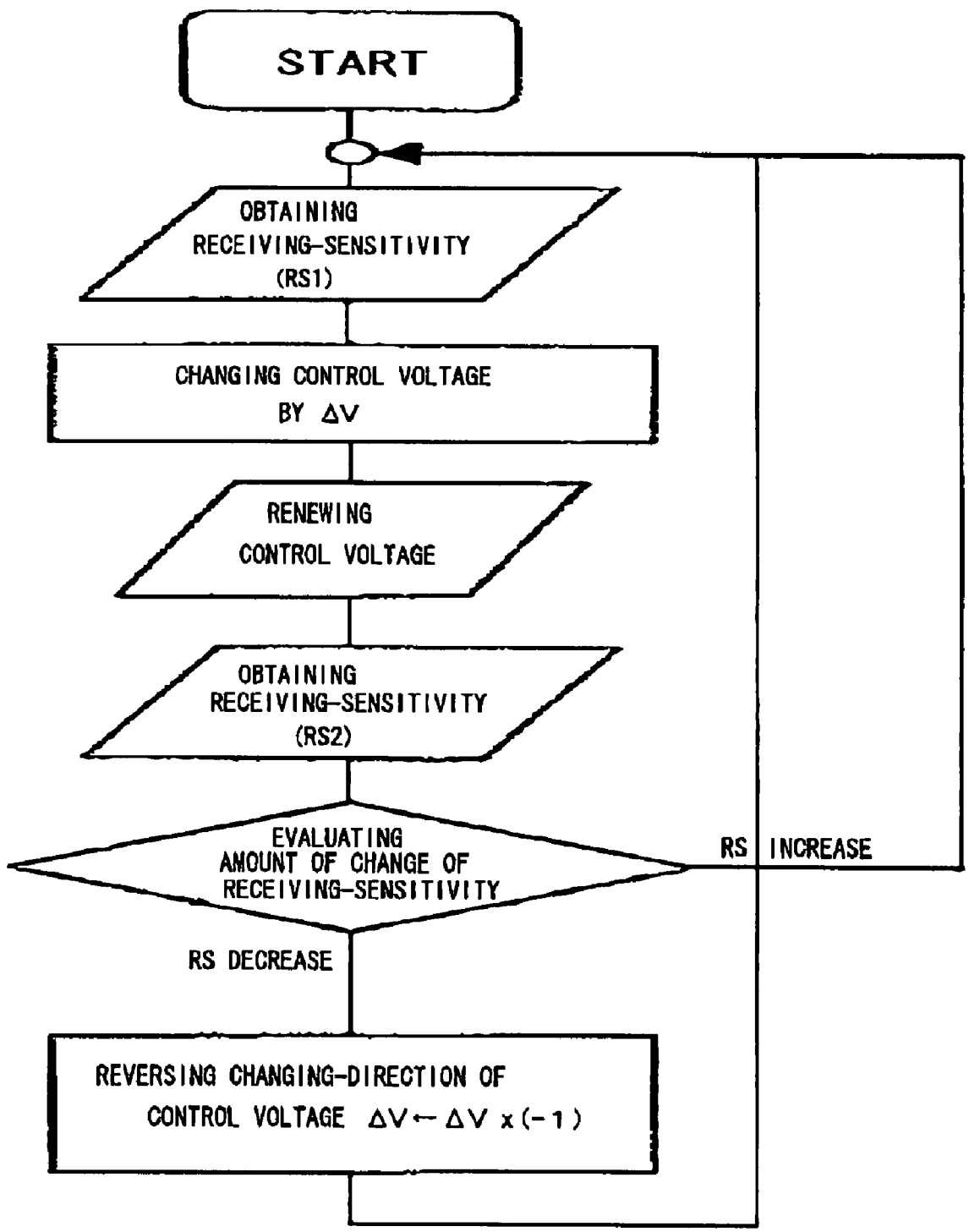
FIG. 4 is a flowchart showing a method according to a second exemplary embodiment of the present invention.
Figure 5:
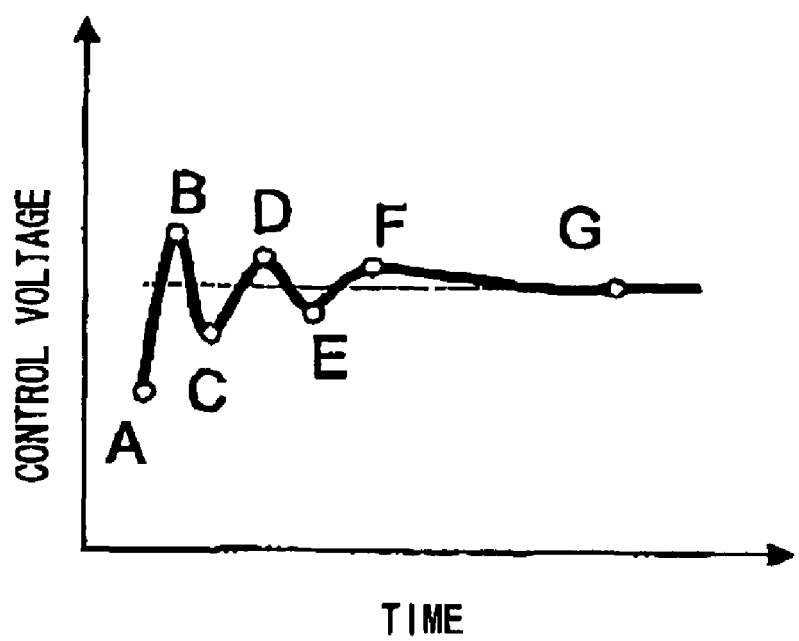
FIG. 5 is a graph of a control voltage and a receiving-sensitivity voltage with regard to a time showing a method in the second exemplary embodiment of the present invention.
Figure 5:
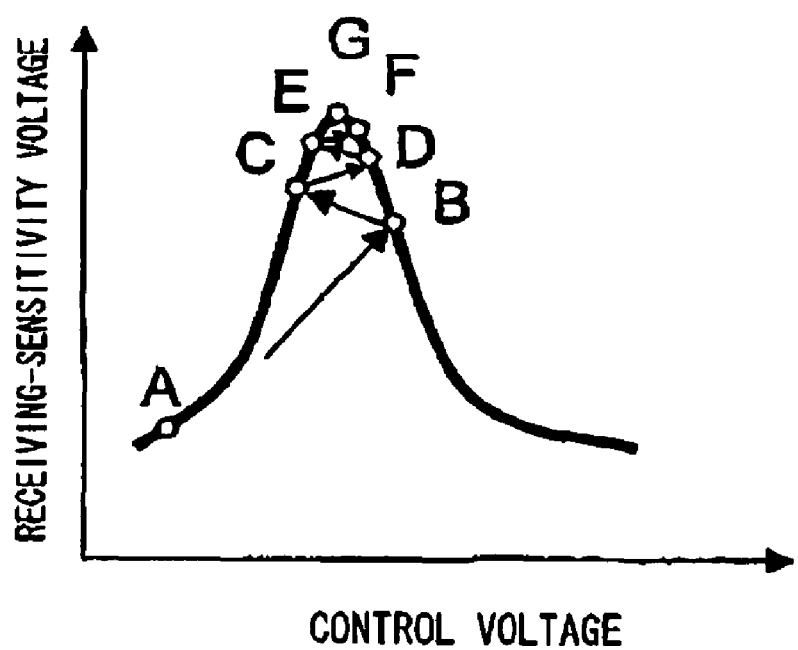

A second embodiment according to the present invention is explained using FIG. 4 and FIG. 5.

FIG. 4 is a flowchart showing an automatic control algorithm which is executed by the micro controller 10 in this exemplary embodiment. FIG. 5 is a graph showing a relation about a control voltage and receiving-sensitivity voltage against time change according to this exemplary embodiment. In this exemplary embodiment, the same circuit configuration as that shown in FIG. 1 is used. However, the automatic control program executed by the micro controller 10 executes an algorithm based on the flowchart shown in FIG. 4.

As shown in FIG. 4, the micro controller 10 reads the receiving-sensitivity voltage outputted to the A/D-converter input terminal 13 from tuner 14, then the micro controller changes a PWM waveform outputted from the PWM output terminal 12 and changes a control voltage. Thereby, a voltage applied to the variable capacitance diode 4 is changed, and then the resonant frequency of the antenna can also be changed.

Thus, the signal received by the tunable antenna 1 is changed, and the signal received by the tuner 14 is also changed. At this time, the micro controller 10 reads the receiving-sensitivity voltage inputted from the A/D-converter input terminal 13 and evaluates whether a value of the receiving-sensitivity voltage increases or decreases. If the receiving-sensitivity voltage decreases, then a changing direction of the control voltage is reversed. That is, when the control voltage increases, the control voltage is changed to a decrease thereof. Conversely, when the control voltage decreases, the control voltage is changed to an increase thereof. By a repetition of such operations, the control voltage inputted to the control voltage input terminal 7 of the tunable antenna 1 is controlled automatically so that the receiving-sensitivity voltage can be maximized. As shown in FIG. 5, the control voltage is changed to A→B→C→D→E→F→G until the maximum receiving-sensitivity voltage is obtained.

According to this exemplary embodiment, since the changing direction of the control voltage is controlled in both positive and negative directions, a time to reach the optimized control voltage can be made shorter than that of the exemplary embodiment 1. Therefore, even if the receiving-sensitivity is degraded, the receiving-sensitivity may be recovered quickly and a screen image can be viewed with no stress (e.g., affect) on television reception and so on.

Additionally, when the receiving-sensitivity voltage is low and the control voltage is still low, a control voltage change is set to a large amount, and every time the changing direction of the control voltage is reversed or the receiving-sensitivity voltage becomes larger, the control voltage change is set to a smaller amount. Thereby, it is possible to reach the optimized control voltage more quickly.

Exemplary Embodiment 3

Figure 6:
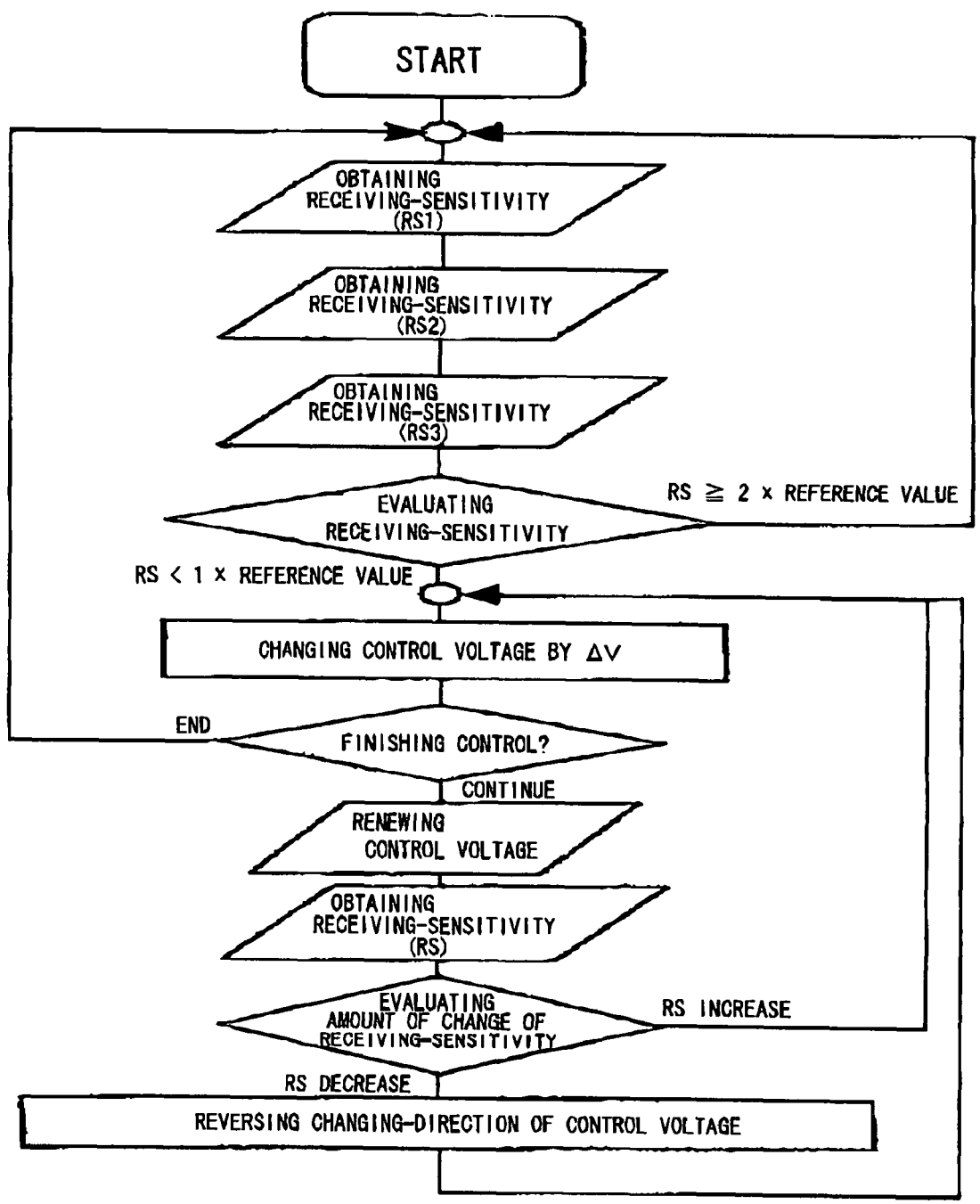
FIG. 6 is a flowchart showing a method according to a third exemplary embodiment of the present invention.
Figure 7A:
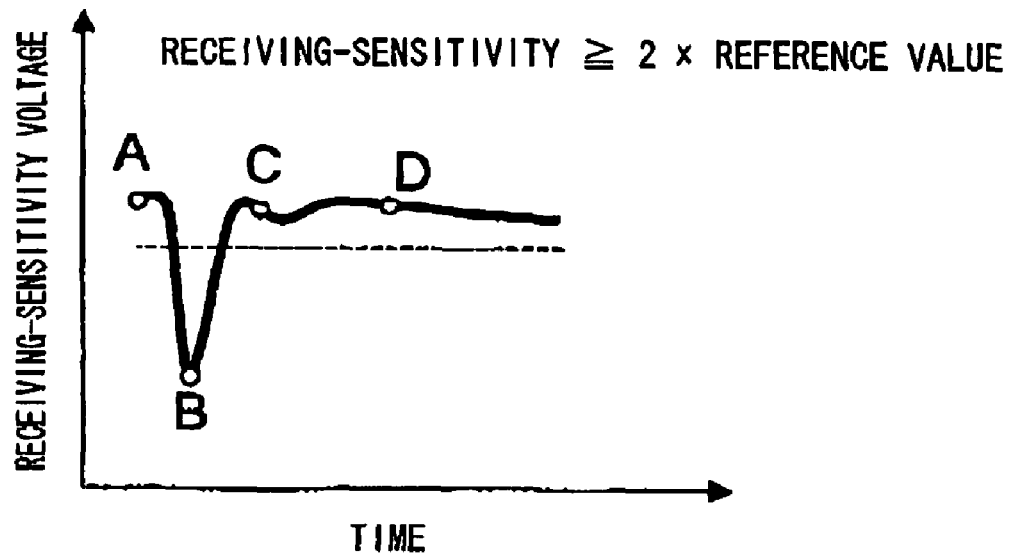
FIG. 7A is a graph of a receiving-sensitivity voltage against a time showing a transaction in a third exemplary embodiment.
Figure 7B:
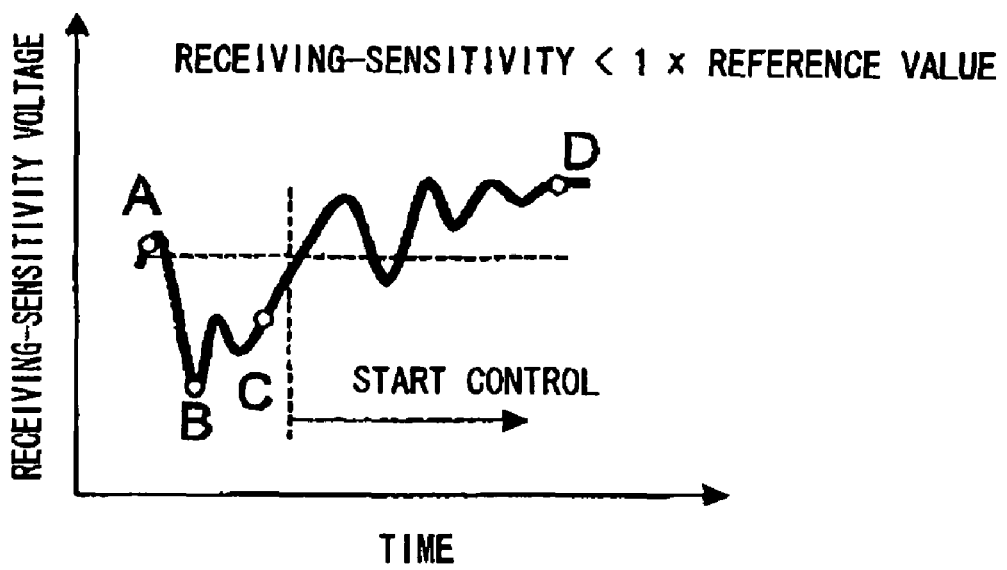
FIG. 7B is a graph of a receiving-sensitivity voltage with regard to a time showing another method in the third exemplary embodiment.

A third exemplary embodiment according to the present invention is explained using FIG. 6, and FIGS. 7A, 7B.

FIG. 6 is a flowchart showing an automatic control algorithm which is executed by the micro controller 10 in this exemplary embodiment. FIGS. 7A and 7B are graphs showing a time change of the receiving-sensitivity voltage in this exemplary embodiment. In this embodiment, the same circuit configuration as that shown in FIG. 1 is used. However, the automatic control program executed by the micro controller 10 executes an algorithm based on the flowchart shown in FIG. 6.

As shown in FIG. 6 or FIG. 7A, the micro controller 10 reads the receiving-sensitivity voltage outputted to the A/D-converter input terminal 13 from tuner 14. When a value thereof is over a reference value (e.g., a predetermined value) in two times out of three times, the control voltage is not changed, and then it is continued to monitor the receiving-sensitivity voltage.

On the other hand, as shown in FIG. 6 or FIG. 7B, when the value of the receiving-sensitivity voltage is over a reference value in only one or less times out of three times, the micro controller 10 changes a PWM waveform outputted from the PWM output terminal 12 and changes the control voltage. Thereby, a voltage applied to the variable capacitance diode 4 is changed, and then the resonant frequency of the antenna can also be changed. That is, a control to detect an optimized receiving condition of tunable antenna 1 is started.

In the first and second exemplary embodiments, the micro controller 10 responds immediately against a sudden degradation of the receiving-sensitivity voltage, and the algorithm for detecting the optimized control voltage is executed. While the algorithm for detecting the optimized control voltage is executed, the receiving-sensitivity may be degraded temporarily. On the other hand, in this exemplary embodiment, since the micro controller 10 does not start the algorithm for detecting the optimized control voltage against the sudden degradation of the receiving-sensitivity voltage immediately, the degradation time of the receiving-sensitivity becomes less, and it is possible to watch a screen image with no stress (e.g., affect) on the television reception and so on.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

Further, it is noted that Applicant's intent is to encompass equivalents of all claim elements, even if amended later during prosecution.

What is claimed is:

1. A tunable receiving apparatus, comprising:
a variable capacitative member;
a tunable antenna having a resonant frequency controlled by said variable capacitative member;
a tuner that outputs a control signal related to a receiving-sensitivity of said tunable antenna; and
a control circuit that processes said control signal and controls said variable capacitative member,
wherein said variable capacitative member is controlled automatically by said control circuit to optimize said receiving-sensitivity,
wherein said control signal outputted by said tuner is dependent on other than a receiving-sensitivity of a frequency band which is not required to receive.

2. The tunable receiving apparatus according to claim 1, wherein:
said control signal outputted by said tuner increases or decreases monotonically with regard to an increase of said receiving-sensitivity.

3. The tunable receiving apparatus according to claim 1, wherein:
said control circuit includes no less than one control voltage output in direct current, and said variable capacitative member is controlled by said control voltage.

4. The tunable receiving apparatus according to claim 1, wherein:
said control circuit stores a procedure for executing said control signal outputted from said tuner.

5. The tunable receiving apparatus according to claim 4, wherein:
said control circuit includes a micro controller having an Analog-to-Digital (A/D)-converter; and
said micro controller controls said variable capacitative member by executing said control signal which is read by said A/D-converter.

6. The tunable receiving apparatus according to claim 1, wherein said control signal outputted by said tuner is independent of the receiving-sensitivity of the frequency band which is not required to receive.

7. The tunable receiving apparatus according to claim 1, wherein the control circuit judges whether a signal received by the tunable antenna is other than a signal required to receive.

8. The tunable receiving apparatus according to claim 1, wherein said control signal outputted by said tuner depends on only a receiving-sensitivity of a frequency band which is required to receive.

9. A tunable receiving apparatus, comprising:
a variable capacitative member;
a tunable antenna having a resonant frequency controlled by said variable capacitative member;
a tuner that outputs a control signal related to a receiving-sensitivity of said tunable antenna; and
a control circuit that processes said control signal and controls said variable capacitative member,
wherein said variable capacitative member is controlled automatically by said control circuit to optimize said receiving-sensitivity,
wherein said control circuit includes no less than one control voltage output in direct current, and said variable capacitative member is controlled by said control voltage,
wherein said control circuit includes a micro controller having a pulse width modulation (PWM) circuit, and
wherein said micro controller controls a pulse width of a PWM output which is outputted from said PWM circuit and controls said variable capacitative member.

10. The tunable receiving apparatus according to claim 6, wherein:
said control circuit includes a smoothing circuit having a resistive element and a capacitative element; and
said control voltage is inputted to said tunable antenna through said smoothing circuit.

11. The tunable receiving apparatus according to claim 6, wherein:
said micro controller includes a memory, monitors said control signal, starts to change said control voltage sequentially when said receiving-sensitivity is deemed as less than a reference value, stores said control voltage to said memory temporarily where said receiving-sensitivity is recorded maximum, and sets said control voltage stored in said memory automatically after termination of the sequential change of said control voltage.

12. The tunable receiving apparatus according to claim 6, wherein:
said micro controller changes said control voltage sequentially;
said control voltage is continued to change in a same direction to the sequential change of said control voltage when said receiving-sensitivity increases with respect to the sequential change of said control voltage;
said control voltage is reversed in the direction of the sequential change of said control voltage when said receiving-sensitivity decreases with respect to the sequential change of said control voltage; and
said control voltage is optimized by repeating a changing of the direction of the sequential change.

13. The tunable receiving apparatus according to claim 10, wherein:
said micro controller monitors said control signal, increases an amount of the sequential changing of said control voltage when said receiving-sensitivity is deemed as less than a reference value, and decreases said amount of the sequential changing of said control voltage according to an increase of said receiving-sensitivity.

14. The tunable receiving apparatus according to claim 10, wherein:
said micro controller monitors said control signal, and increases an amount of the sequential changing of said control voltage when an amount in which said receiving-sensitivity is deemed as less than a reference value is more than a set amount.

15. A method of tuning a receiving apparatus including a tunable antenna, said method comprising:
outputting a control signal related to a receiving-sensitivity of said tunable antenna;
monitoring said control signal;
changing a control voltage for controlling a resonant frequency of said tunable antenna sequentially depending on a value of said control signal;
storing said control voltage in which said receiving-sensitivity is recorded as a maximum during a sequential changing of said control voltage;
controlling said tunable antenna at the stored control voltage;
continuing to change said control voltage sequentially in a same direction when said receiving-sensitivity increases with respect to the sequential change of said control voltage; and
reversing a direction of the sequential change of said control voltage when said receiving-sensitivity decreases with respect to the sequential change of said control voltage.

16. The method as defined in claim 14, further comprising:
increasing an amount of the sequential changing of said control voltage when said receiving-sensitivity is deemed as less than a reference value; and
decreasing said amount of the sequential changing of said control voltage according to an increase of said receiving-sensitivity.

17. The method as defined in claim 14, further comprising:
increasing an amount of the sequential changing of said control voltage when an amount in which said receiving-sensitivity is deemed as less than a reference value is more than a set amount.

* * * * *